United States Patent
Zilahy et al.

[15] 3,646,656
[45] Mar. 7, 1972

[54] MACHINE HAVING OVERHANG SUPPORTS FOR PALLETS

[72] Inventors: Zoltan E. Zilahy, Nutley; Anthony L. Dato, River Vale, both of N.J.

[73] Assignee: Standard Tool & Manufacturing Co.

[22] Filed: Apr. 30, 1970

[21] Appl. No.: 33,440

[52] U.S. Cl. ............................................29/200 A, 198/19
[51] Int. Cl. .....................................B23p 19/04, B23q 5/22
[58] Field of Search .............198/19, 189; 29/200 A; 269/55, 269/58

[56] References Cited

UNITED STATES PATENTS

| | | | |
|---|---|---|---|
| Re. 25,886 | 10/1965 | Cargill | 29/200 A |
| 900,281 | 10/1908 | Holmes | 198/19 X |
| 2,819,784 | 1/1958 | Brown | 198/19 |

Primary Examiner—Edward A. Sroka
Attorney—Harness, Dickey & Pierce

[57] ABSTRACT

Carriers are suspended on vertical rails providing a cantilever support for pallets which permit a machining operation to be performed on the bottom face of a workpiece as well as the other surfaces thereof. A further novelty resides in the drive for the carriers by a single strand hollow pin conveyor chain which is bendable in a horizontal plane so that it may assume any configuration depending on the type of machining to be performed and the area which the machine is to occupy. The pallet may be movably supported on the carrier or may be fixed thereto and when movably supported, the pallet is shifted in two directions and secured in fixed position at a station. The chain has wear plates thereon and wear plates are mounted on the carrier in engagement with those on the chain which frictionally drives the carriers until one carrier is stopped as the chain continues to advance.

15 Claims, 8 Drawing Figures

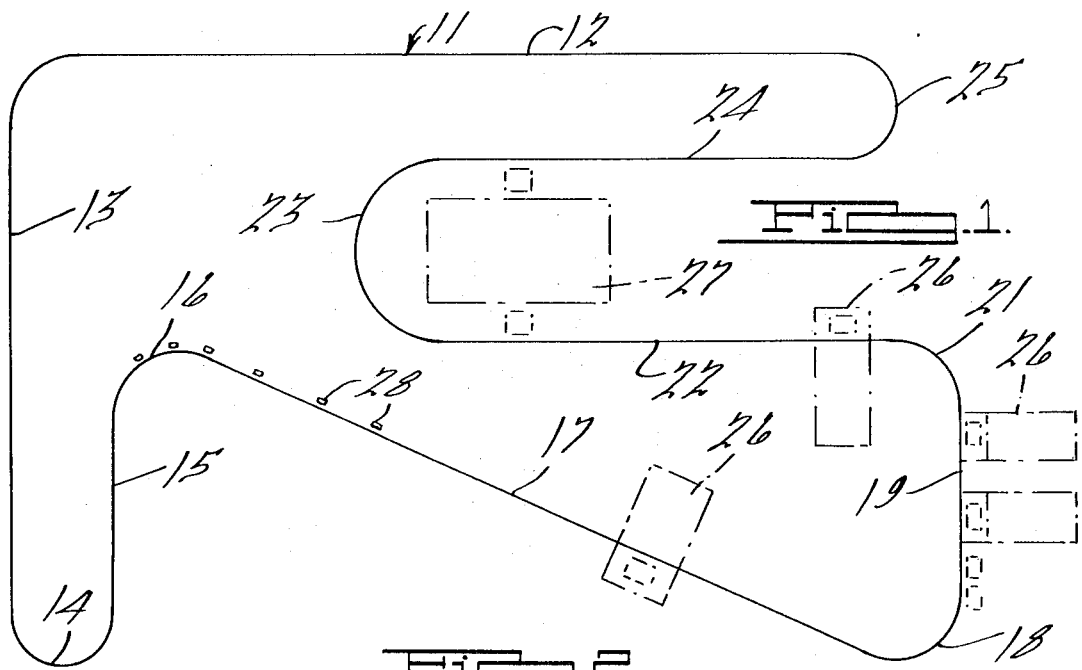
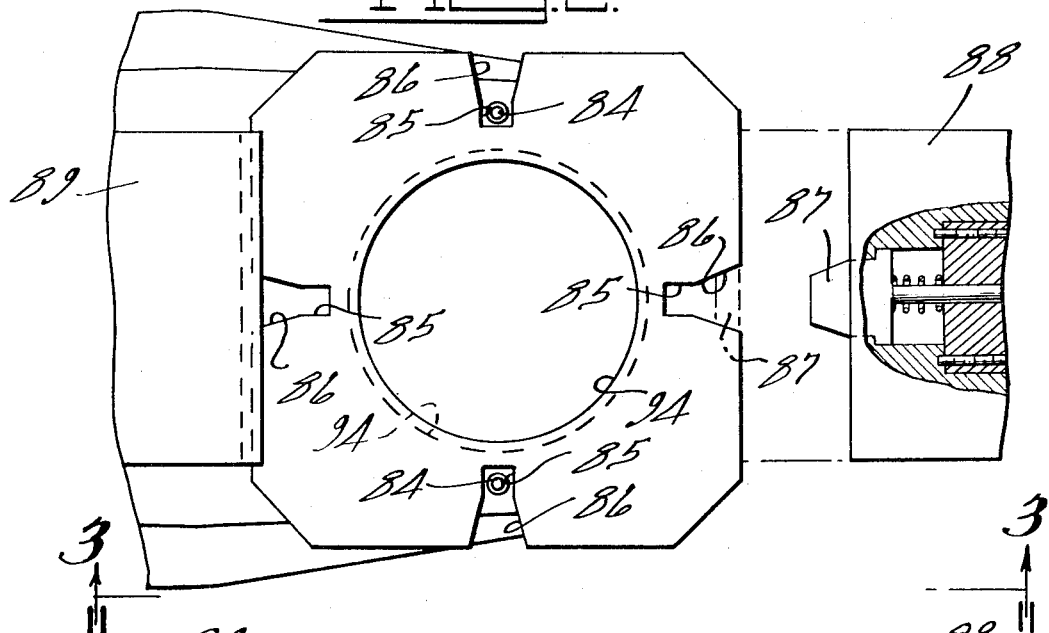
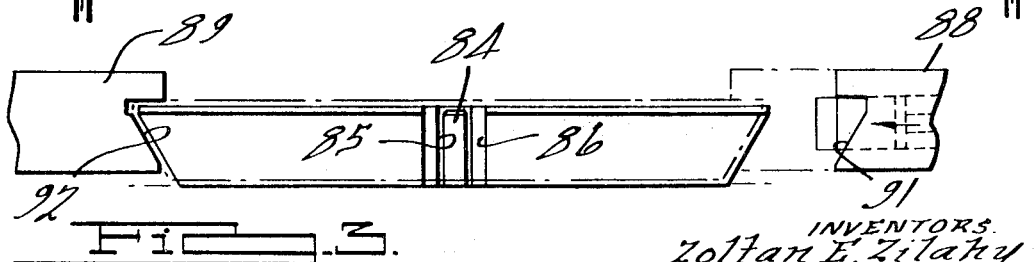

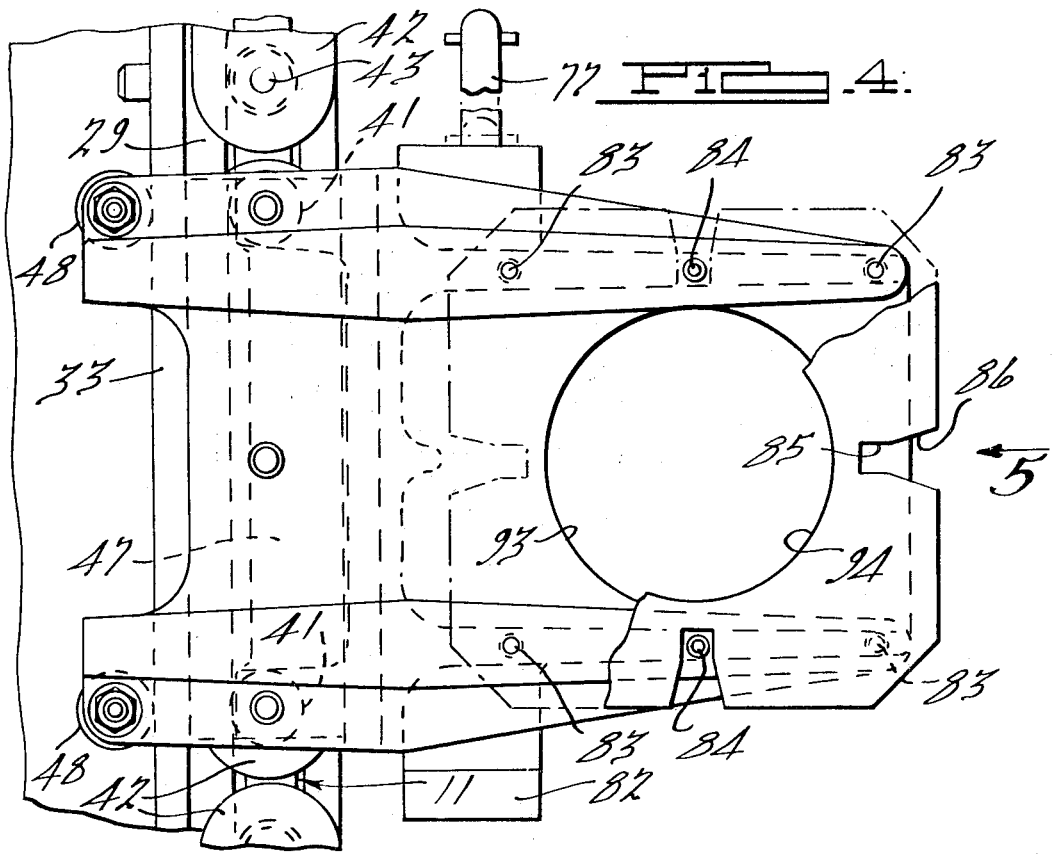
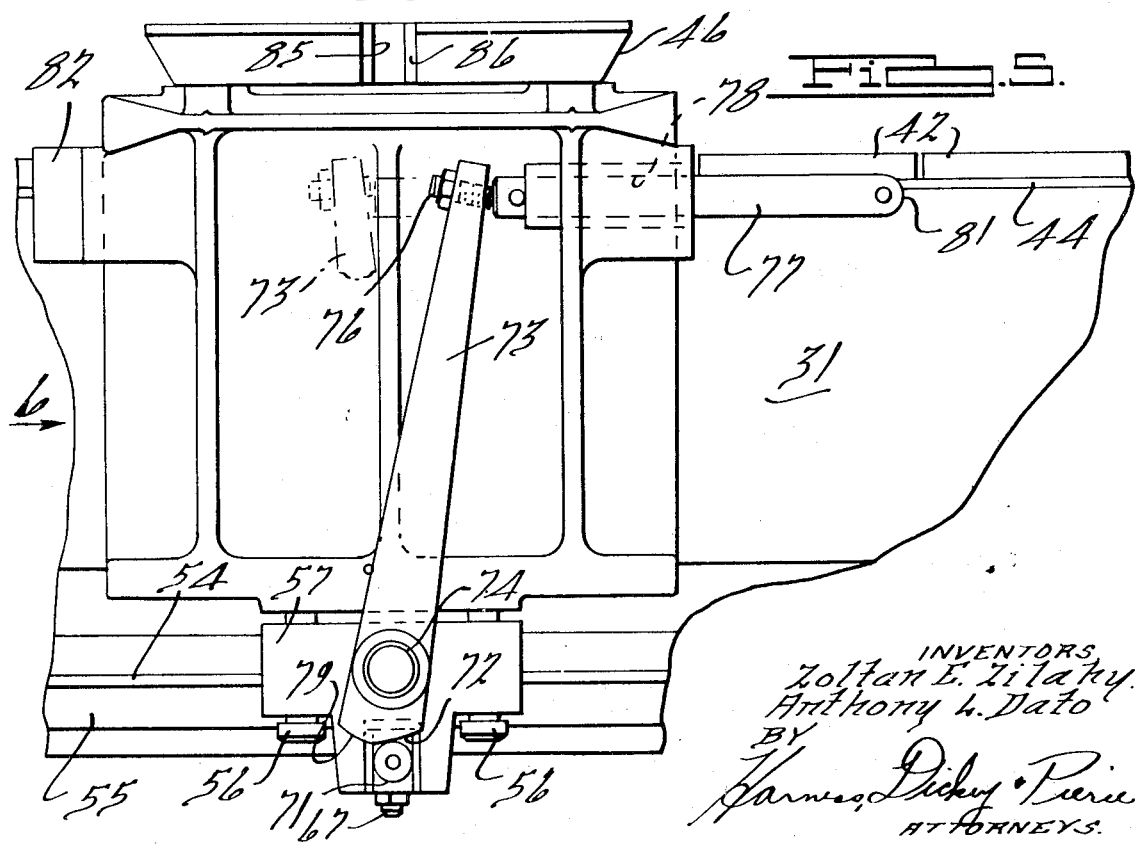

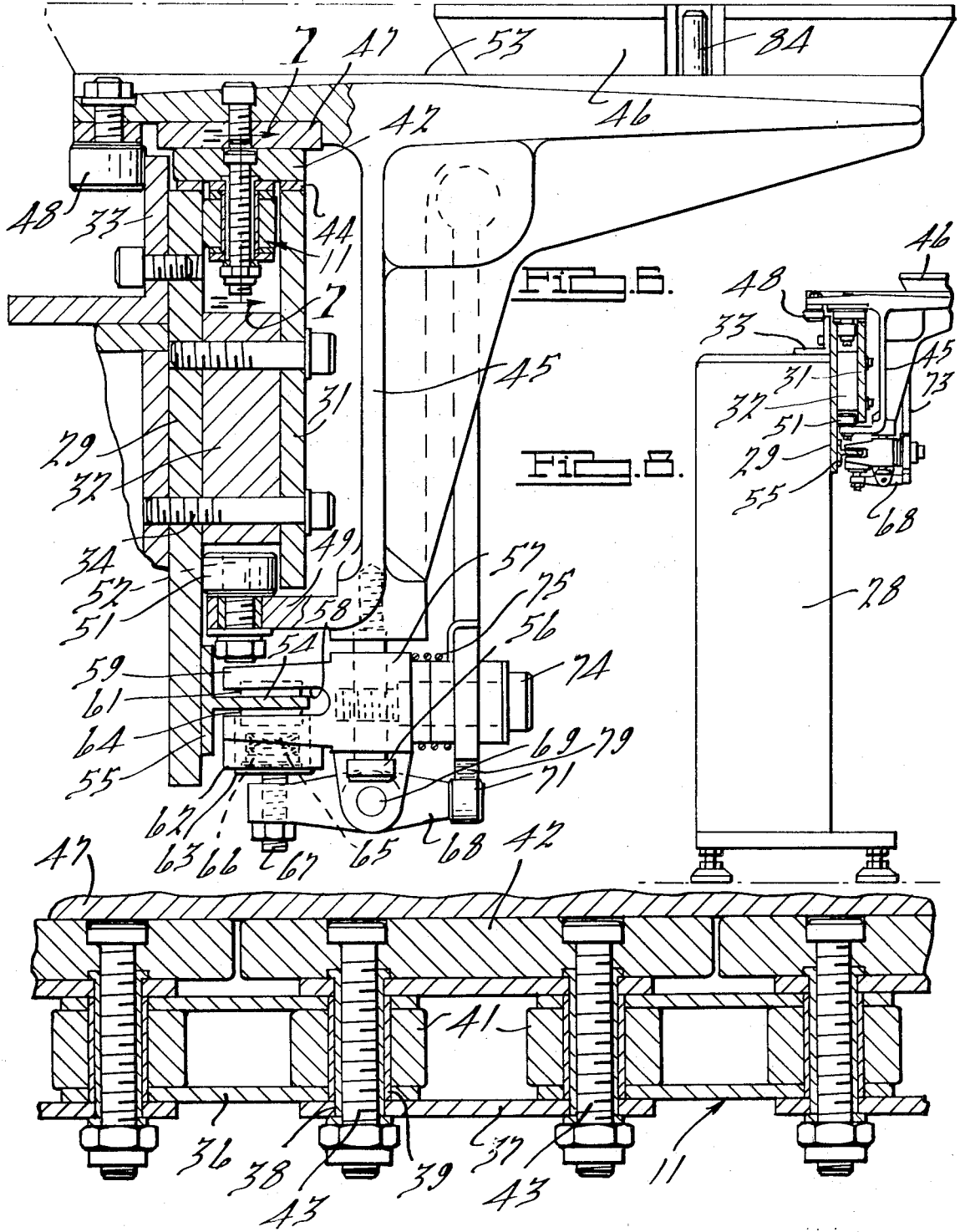

3,646,656

MACHINE HAVING OVERHANG SUPPORTS FOR PALLETS

BACKGROUND OF THE INVENTION

Reference may be had to D. A. Cargill, Reissue U.S. Pat. No. Re. 25,886 to show the state of the art of pallets which when stopped permits the drive to continue to advance.

SUMMARY OF THE INVENTION

The invention pertains to a support made up of sections which have vertical rails on which carriers are supported in cantilever. The rails are spaced by blocks to provide a passageway at the top for a single strand conveyor chain made up of links which hinge in a horizontal plane. The chain has wear plates thereon which contacts wear plates on the carriers to produce a friction drive therebetween. The carrier has a pair of rollers which engage the rear side of the vertical rail at the top and a pair of eccentrically mounted rollers which engage the front side of the rail at the bottom which are adjustable to position the supporting extension for the pallet in a horizontal plane. The rails also support a horizontal brake flange which is engageable by brake shoes on a vertical shiftable support actuated by one end of a tiltable bar through a spring for applying a predetermined clamping pressure on both sides of the brake flange. The opposite end of the tiltable bar has a roller engageable by a cam end of a lever which is actuated by a plunger when engaging a stop or a stopped carrier for applying a predetermined pressure to the brake shoes. This will slow down the carrier as the wear plates on the chain advance relative to the wear plate on the carriers. When the preceeding carrier again moves, the plunger will be released releasing the brake shoes and permitting the carrier to again be advanced by the chain. The carriers have a forward extension for supporting the pallets and have a large central opening which is aligned with a large central opening through the pallet which permits a machine operation to be performed on the bottom portion of the workpiece supported thereby. The pallet has slots in the side edges which diverge at the outer ends, two of which receive a pair of pins which are smaller in diameter than the width of the slots to provide substantial clearance which permits the pallet to be shifted in two directions when being clamped at a station. A wedge plate has a spring pressed finger which engages a slot and moves the pallet parallel to the conveyor chain while the wedge plates move the pallet at right angle thereto into clamping engagement with a stationary wedge plate. It is within the purview of the invention to secure the pallet in fixed relation to the carrier extension. When loosely mounted thereon, the pallet may be removed and rotated in increments of 90° and may be returned to the same or on a different carrier. When removed, a machining operation may be performed on the workpiece at a station remote from the conveyor chain and rails. The braking arrangement may be eliminated and resilient means may be provided between the carriers to produce the stopping of the carriers at a station or one relative to the other without producing too great an impact.

BRIEF DESCRIPTION OF THE DRAWINGS

FIG. 1 is a plan view showing an undulated path for the conveyor chain and supporting rails for advancing the carriers and pallets to different stations;

FIG. 2 is a broken plan view of a carrier with a pallet thereon before being accurately positioned and clamped at a machining station;

FIG. 3 is a view of the structure illustrated in FIG. 2, as viewed from line 3—3 thereof;

FIG. 4 is a view of structure, similar to that illustrated in FIG. 2, showing the pallet and carrier mounted on a vertical support and frictionally driven by a conveyor chain hingeable in a horizontal plane;

FIG. 5 is a view of the structure illustrated in FIG. 4, as viewed from the point 5 thereof;

FIG. 6 is a view, partly in action, of the structure illustrated in FIG. 5, as viewed from the point 6 thereof;

FIG. 7 is an enlarged sectional view of the structure illustrated in FIG. 6, taken on the line 7—7 thereof, and FIG. 8 is the reduced view of the structure illustrated in FIG. 6, showing the standards to which the vertical supports are secured.

DESCRIPTION OF THE PREFERRED EMBODIMENT

Referring to FIG. 1, a continuous conveyor chain 11, by way of example, is illustrated as passing along an upper path 12, a lefthand path 13, reversing itself at 14 to pass along a path 15, reversing itself at 16 and then advancing angularly along a path 17 and reversing itself at 18. The chain then moves along a path 19, an arcuate path 21, a straight path 22, reversing itself at 23, advances along a path 24, reversing itself at 25 to the first mentioned path 12. Along these different paths of the chain, any number of stations 26 and 27 are positioned in spaced relation to each other. Only a few of the stations are herein illustrated which may be automatic or manual to perform different operations on a workpiece mounted on the pallet which is supported on a carrier and advanced by the conveyor chain. Along the path of the conveyor chain, as illustrated in FIG. 8, standards 28 are provided for supporting vertically disposed rails 29 and 31 which are spaced apart by blocks 32. The rails are secured to the standard by angle rail member 33 and by screws 34. The conveyor chain 11 is disposed between the rails 29 and 31 above the blocks 32 having inner links 36 and outer links 37 connected by headed sleeves 38 with the outer link spaced by bearing sleeves 39 engaged by the inner links 36 and rollers 41, as illustrated in FIG. 7. The links are disposed in horizontal planes to permit them to move along an undulated horizontal path. Hardened wear plates 42 are secured to pairs of the sleeves 38 by bolts 43. These plates ride upon hardened wear strips 44 secured to the upper end of the rails 29 and 31. Carriers 45 for pallets 46 have wear plate 47 provided thereon which are supported on the conveyor chain wear plates 42. The carrier has a pair of spaced rollers 48 at the top rear edge which engages the remote face of the angle rail member 33. The bottom of the carrier has a rearwardly extending flange 49 on which rollers 51 mounted on eccentric stub shafts 52 are supported. The rollers are adjustable to locate a pallet supporting extension 53 in a horizontal plane. The downward weight of the carrier and the wear plate 47 is supported on the wear plates 42 of the conveyor chain 11 which advances the carrier 45, the pallet 46 and workpiece carried thereby along the rails 29 and 31. The carrier may be stopped at any station or when contacting a carrier directly ahead thereof which is slowed down or stopped. The wear plates 42 on the chain will continue to advance while engaging the wear plates 47 of the carrier without any substantial wear occurring therebetween. This stoppage could occur by the use of urethane or like bumpers or springs to cushion the shock which would otherwise occur. Preferably the carrier is slowed down and stopped by a braking action. While various types of brakes may be employed, a pinch type of brake is herein illustrated. A brake flange 54 is supported on the rail 29 by a supporting web 55 which forms a T-shaped section with the brake flange. The bottom of the carrier 45 is provided with a pair of headed pins 56 on which a boss 57 is slidably supported. The boss has a slot 58 on its inner portion which straddles the brake flange 54. The portion 59 above the slots supports a brake pad 61 which is fixed thereto. The bottom portion 62 supports a capsule 63 having a brake pad 64 at the top, a plurality of Belleville spring washers 65 and a disc 66 at the bottom. The disc 66 is engaged by an adjustable stud 67 on the adjacent ends of a rockable bar 68 which is secured to the boss 57 by a pivot 69. When the stud 66 is moved upwardly, the brake pad 64 engages the bottom side of the brake flange 54 and draws the boss 57 downwardly on the headed pins 56 to move the brake shoe 61 with a like force against the upper face of the brake flange 54. The two brake shoes clamp the flange with a pressure exerted by the Belleville spring washers 65 which is adjustable. The forward end of the rocking bar 68 carries a roller 71 engaged by a cam surface 72 on the end of a lever 73 of substantial length which is pivoted to the boss 57 on a headed stud 74. A spring 75 urges the lever 73 in a clockwise direction, as illustrated in FIG. 5. The upper end of the lever carries an adjustable screw 76 which is aligned with the end of a plunger 77 mounted for longitudinal movement in an aperture 78 in the carrier.

The bottom of the lever 73 also has an arcuate portion 79 in continuation of the cam surface 72 to form a dwell section so that the pressure produced by the Belleville spring washers 65 can be set to produce a predetermined braking force on the brake shoes 61 and 64 irrespective of the amount the lever was moved. The end 81 of the plunger 77 is located in position to strike a stop element position along a path of the conveyor chain 11 or to strike the face of a hardened block 82 attached to the opposite end of the carrier 45 when the stopped preceding carrier is located on the straight or curved portion of the path of the conveyor chain. The striking of the end 81 against a stop element or a preceding carrier stops the plunger 77 which moves the advancing lever 73 counterclockwise camming the roller 71 downwardly to rock the tiltable bar 68 and move the threaded screw 67 upwardly to apply a braking force to the brake shoes 61 and 64. The braking pressure can be accurately adjusted relative to the length of the cam surface 72 after which a dwell will occur when the roller is engaged by an arcuate portion 79 upon further movement of the lever. This will prevent the brake shoes from grabbing and slowly applies a holding pressure to permit the wear plates 42 of the chain to slide relative to the wear plates 47 on the carrier. In this manner, the carrier is slowed and eventually stopped without striking a preceding carrier with any substantial force.

The horizontal extension 53 of the carrier 45 provides a cantilever support for the pallet 46 which may be fixed thereon by screws secured in threaded apertures 83 provided on the extension. This may be desired when manual operations are to be performed at the machining stations. When automatic operations are to be performed at the stations, a pair of pins 84 extend upwardly from the extension 53 which project within slots 85 provided at the center of each edge of the pallet. The width of the slots 85 is substantially greater than the diameter of the pins so that the pallet can be shifted relative thereto. The outer portion of the slots 85 diverge at 86 for engagement by a spring pressed finger 87 on a wedge-type locking element 88 movable toward a fixed wedge-type locking plate 89 provided at the working station. When the carrier is stopped at the station, the locking element 88 is advanced to first have the finger 87 engage the diverging portion 86 of the adjacent slot 85 to shift the pallet parallel to the path of movement of the conveyor chain. The further movement of the locking element 88 causes the wedge portion 91 thereof to engage the adjacent edge of the pallet and force it into engagement with the like wedge portion 92 on the fixed locking plate 89. This cams the pallet upwardly into fixed position while shifting normal to the path of movement of the chain conveyor to have it accurately located in both directions.

As illustrated in FIG. 4, the horizontal extension 53 of the carrier 45 has a large aperture 93 which is aligned with an aperture 94 in the center of the pallet. This permits machining to be undertaken on the bottom of the workpiece supported by the pallet. Substantially all portions of the workpiece may be machined, the sides, top and bottom thereof without removing it from the pallet. The retention of the pallet on the carrier by the pins 84 permits the pallet to be raised and rotated by increments of 90° to different positions or to be entirely removed so that the workpiece may be machined by a manual operation at a remote point and returned to the same or a different carrier.

The rails 29 and 31 are preferably provided in sections of predetermined length secured together on the standards 28. The arcuate sections are of the same or different lengths supported by other standards 28 to provide a continuous rail of substantially any configuration. The arcuate path has such a radius as to permit the carriers to travel therealong while maintaining the plunger 77 aligned with the block 82 on a preceding carrier so that contact may always occur therebetween at any position along the conveyor chain path.

Should extra time be required for an operation at a work station, the carrier may remain stationary for a longer period than the allotted time as one or more additional carriers will be stopped thereby as they are advanced by the conveyor chain. When the retained carrier is released, the other carriers are free to advance to the station and as the work progresses all of the carriers will be advanced by the chain in spaced relation to each other. The supporting of the carrier on the vertical rails permits the horizontal extension to be supported in cantilever so that machining can occur on the bottom of the workpiece when apertures are provided in the carrier and the pallet. The hinging of the chain in the horizontal path permits the chain to travel in any direction as a closed loop or in an undulated or straight path as necessity dictates. The machining stations may be placed within or outside of the loop or both and any of the carriers can be stopped at any time at any place along the conveyor chain path as the conveyor chain is driven continuously at a constant speed. This provides minimum machine time while permitting extra time for the machine operation at the stations as may be required from time to time. The stopping of the carrier for the extra period of time also permits the changing and adjustment of the tools and other minor maintenance requirements without shutting down the conveyor line.

I claim:

1. In a work-conveying device, a plurality of carriers for supporting and advancing workpieces, a support having straight and arcuate sections upon which said carriers are movable, a chain having the links disposed substantially horizontal for advancing said carriers on the support with the links on the chain pivotable in a horizontal plane, wear plates on the chain and carriers providing a driving relation therebetween when the carriers are free to advance, and stop means on the carriers which when engaged interrupt their advancement and permit the wear plates on the chain to continue to advance relative to the wear plate on the stopped carriers.

2. In a work-conveying device as recited in claim 1, wherein said stop means is a brake, and movable means supported by the carrier for operating said brake when the movable means is actuated by a stop element or by the preceeding stopped carrier.

3. In a work-conveying device as recited in claim 2, wherein said brake embodies a horizontally extending brake flange on the carrier support, and brake shoes on said carriers which are relatively moved upon the actuation of the lever means to have the brake shoes clamp on opposite sides of the brake flange.

4. In a work-conveying device as recited in claim 3, wherein said movable means is a lever and wherein an actuatable element is operated by the lever for relatively moving said brake shoe, and resilient means provided between the actuatable element and the movable brake shoe for producing a braking force by said resilient means.

5. In a work-conveying device as recited in claim 4, wherein the lever has a cam portion in engagement with the actuatable element for applying pressure to the movable brake shoe through said resilient means, and a dwell portion in extension of said cam portion which limits the force on the brake shoe applied through said resilient means by the further movement of said lever.

6. In a work-conveying device as recited in claim 5, wherein plunger means is supported by the carrier with one end extending forwardly thereof in alignment with the end of the preceding carrier for actuating the lever when the plunger is moved relative to the carrier upon striking a stop element or the preceeding carrier.

7. In a work-conveying device as recited in claim 1, wherein the carrier has a laterally projecting pallet supporting extension suspended in cantilever from one side thereof.

8. In a work-conveying device as recited in claim 7, wherein a pallet is movably retained on said supporting extension.

9. In a work-conveying device as recited in claim 8, wherein said pallet has an aperture therethrough alignable with an aperture through the supporting extension which permits the bottom of the workpiece supported by the pallet to be operated upon.

10. In a work-conveying device as recited in claim 9, wherein the pallet supports are pins extending upwardly from the forwardly extending portion of the carrier, the edges of said pallet having a slot therein substantially wider than the diameter of the pins so as to be movable relative thereto when retained thereby, said slots having diverging outer edge portions, a wedge plate carried at a station where work is to be performed, and a movable wedge element having a spring pressed finger with converging sides at the end which engage the diverging side edges of the slot to shift the pallet parallel to the support while the wedge block moves the pallet normal thereto and secures the pallet which is accurately located at the stations.

11. In a work-conveying device, a plurality of carriers for supporting and advancing workpieces, vertically disposed rail means along which said carriers are advanced, a continuous horizontally bendable chain on said rail means, means on said chain having frictional engagement with said carriers for advancing said carriers therewith when the carriers are free to be advanced, a lateral extension on the carriers on which a pallet is supported, and means on said carriers in engagement with a side of said rail means to prevent the carriers from tilting laterally relative thereto.

12. In a work-conveying device as recited in claim 11, wherein a pallet supported by said carrier extension has an aperture therethrough aligned with an aperture through the extension through which an operation may be performed on a workpiece supported on the pallet.

13. In a work-conveying device as recited in claim 12, wherein said pallet is movably supported on said carrier extension.

14. In a work-conveying device as recited in claim 13, wherein said pallet is movably supported on said extension in one of 90° increments of angular displacement in the plane of the pallet.

15. In a work-conveying device as recited in claim 14, wherein means are provided for clamping the pallet at a station along the rail means as it is shifted into accurately located position longitudinally and normally to said rail means.

* * * * *